(12) United States Patent
Montebello

(10) Patent No.: US 8,517,358 B2
(45) Date of Patent: Aug. 27, 2013

(54) GAS SPRING FOR SLIDING REFRACTORY GATE VALVE

(75) Inventor: Antony Rupert Montebello, Hailsham (GB)

(73) Assignee: Nutberry Limited, Hailsham (GB)

( * ) Notice: Subject to any disclaimer, the term of this patent is extended or adjusted under 35 U.S.C. 154(b) by 0 days.

(21) Appl. No.: 13/392,742

(22) PCT Filed: Aug. 2, 2010

(86) PCT No.: PCT/GB2010/001460
§ 371 (c)(1),
(2), (4) Date: May 9, 2012

(87) PCT Pub. No.: WO2011/023928
PCT Pub. Date: Mar. 3, 2011

(65) Prior Publication Data
US 2012/0217687 A1    Aug. 30, 2012

(30) Foreign Application Priority Data

Aug. 25, 2009 (GB) .................................. 0914834.7

(51) Int. Cl.
*F16F 5/00* (2006.01)
(52) U.S. Cl.
USPC ............................. 267/121; 267/123; 267/151
(58) Field of Classification Search
USPC .................. 267/121, 122, 123, 151, 152, 182
See application file for complete search history.

(56) References Cited

U.S. PATENT DOCUMENTS

| | | | |
|---|---|---|---|
| 2,564,394 A * | 8/1951 | Cole | ............................. 267/152 |
| 4,189,073 A | 2/1980 | Lothmann | |
| 4,997,410 A | 3/1991 | Polster et al. | |
| 5,027,637 A | 7/1991 | Umetsu | |
| 5,582,391 A | 12/1996 | McNair et al. | |
| 2005/0103587 A1 | 5/2005 | Fischer et al. | |

FOREIGN PATENT DOCUMENTS

| | | |
|---|---|---|
| CN | 201279584 Y | 7/2009 |
| DE | 3942737 A1 | 6/1990 |
| DE | 10324801 A1 | 1/2005 |
| GB | 165431 A | 1/1922 |
| GB | 1457708 A | 12/1976 |
| GB | 1518841 A | 7/1978 |
| JP | 2006-242278 A | 9/2006 |
| SU | 996768 A1 | 2/1983 |

OTHER PUBLICATIONS

International Search Authority/European Patent Office (ISA/EP). International Search Report and Written Opinion, Application PCT/GB2010/001460. Sep. 22, 2010.
Great Britain Search Report issued in GB Application No. 0914834.7, mailed on Nov. 19, 2009.

* cited by examiner

*Primary Examiner* — Pamela Rodriguez
(74) *Attorney, Agent, or Firm* — The Marbury Law Group PLLC

(57) ABSTRACT

A gas spring (10) for a sliding refractory gate valve, comprising a container (12), a ram (28) which is extendable relative to the container, a bellows (30) connected at one end to the ram and at the other end to a part of the container, a gas (33) within the container outside the bellows and acting to compress the bellows and extend the ram, wherein the ram has a blind internal bore (49) and a mechanical compression spring (46) is at least partially disposed in the bore so as to be interposed between the ram and the container and also acting to extend the ram.

12 Claims, 6 Drawing Sheets

GAS SPRING FOR SLIDING REFRACTORY GATE VALVE

This invention relates to gas springs for sliding refractory gate valves.

BACKGROUND

Gas springs (also known as Thermo Dynamic Elements, TDEs) are used in sliding gate valve mechanisms which control the flow of molten steel during the continuous casting process. The springs within the mechanism are used to clamp face-to-face relatively sliding refractory plates together. The plates each have a bore in the middle; when the two bores are aligned the flow of steel is at its maximum. Depending on the position of these plates the aperture of the bore increases or decreases thereby determining the flow rate of the steel.

The springs must supply sufficient force to ensure that molten steel cannot get between the plates (which is known as finning), which could then potentially lead to a breakout of molten steel, which can be extremely dangerous as well as costly. The sliding of the refractory plates is powered by hydraulics.

A gas spring (TDE) consists essentially of a metal ram connected to a metal bellows (usually stainless steel), with an inert gas in a sealed chamber and applying pressure to the ram. In one form the gas is inside the bellows which thus expand to extend the ram as the gas expands; in another form the bellows are sealed into an outer container and the gas is outside the bellows and ram and inside the container, thereby to compress the bellows and extend the ram as the gas expands.

The springs need to be of compact design whilst providing adequate force. Gas springs have proven capable of satisfying this requirement.

Examples are shown in GB-A-1 457 708.

During the casting process the temperature near the spring pockets can exceed 400° C.

Gas springs have the advantage that at higher temperatures the gas pressure increases to apply a greater force on the sliding plates, thereby preventing any finning. They also provide an extra element of safety, since the normal failure mode is due to the bellows fatiguing. As such, it would be extremely unlikely for all the gas springs within the mechanism to fail at the same time, unlike other types of spring which may have a failure mode related to temperature and thus may all fail together at the same temperature.

Known designs of gas spring can provide a guaranteed number of heats (cycles) at a maximum temperature of e.g. 500° C. However, there have been many cases where the gas springs have been operating in temperatures above 700° C.

For certain mechanisms the force applied by the gas spring at high temperatures is too great to allow the sliding mechanism to operate.

SUMMARY

According to the invention we provide a gas spring for a sliding refractory gate valve, comprising a container, a ram which is extendable relative to the container, a bellows connected at one end to the. ram and at the other end to a part of the container, a gas within the container outside the bellows and acting to compress the bellows and extend the ram, wherein the ram has a blind internal bore and a mechanical compression spring is at least partially disposed in the bore so as to be interposed between the ram and the container and also acting to extend the ram.

The invention allows the provision of a refractory gate valve gas spring of compact design which integrates an appropriate mechanical spring with the gas spring function.

It is possible for the manufacturer of the gas spring to specify the initial gas pressure and the length and spring constant of the mechanical compression spring. The invention provides the possibility of tailoring the force exerted by the gas spring at both higher and lower temperatures, thereby providing a gas spring which provides adequate force at lower temperatures but does not exert excessive force at higher temperatures.

By providing a preload on the mechanical compression spring in the room temperature condition, the amount of gas needed to provide the total working force at lower temperatures may be reduced, thereby obviating the excessive gas pressure at higher pressures. In effect, the gradient of the force/temperature curve can be reduced.

It is known in the industry that mechanical springs can be used alone in sliding gate valves, but they are generally perceived as less advantageous than gas springs, and in particular are known to be unsuitable for use at higher temperatures. However, we have found that they can be employed satisfactorily, indeed advantageously, in combination with a gas spring effect when disposed within the blind bore of the ram in accordance with the invention.

Another advantage has been found to flow from the invention, and this concerns safety under failure. As mentioned above, a gas spring can fail due to bellows fatigue. The failure would be instantaneous. Although the clamping force provided from the remaining gas springs within the mechanism would usually be sufficient to prevent a breakout, plate wear may become excessive due to the uneven clamping force and a chance of finning may hence arise. The mechanical compression spring provides a secondary force that does not rely on the gas as a spring medium and can supply a limited amount of force after the gas has been expelled, which may be sufficient to reduce the chance of finning.

BRIEF DESCRIPTION OF THE DRAWINGS

Certain embodiments of the invention will now be described by way of example only and with reference to the drawings.

DETAILED DESCRIPTION

Figure 1:
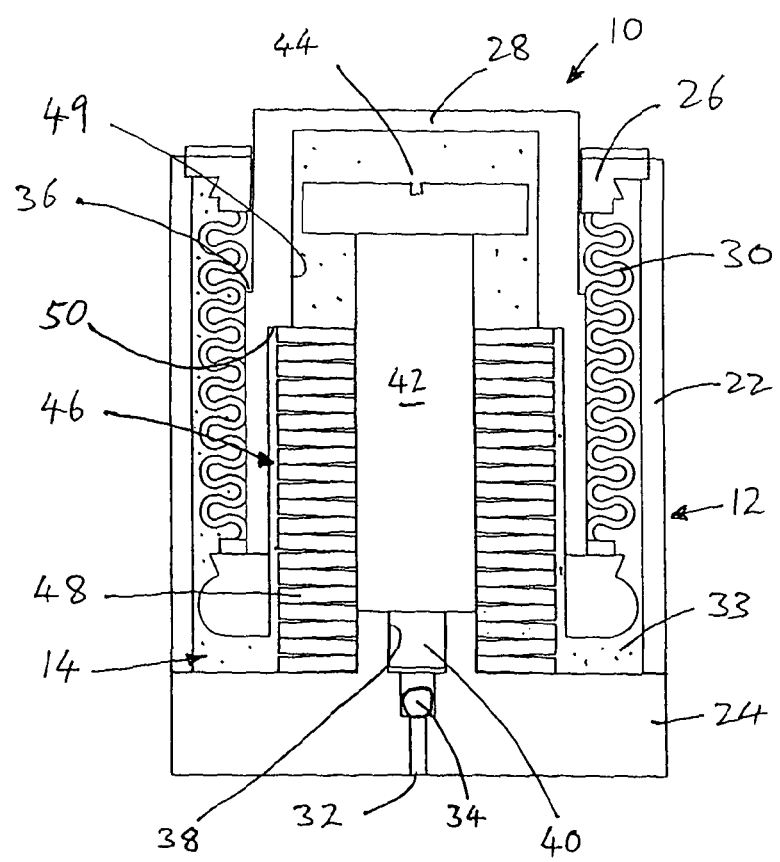
FIG. 1 is a schematic section of an embodiment of a gas spring in accordance with the invention.

Referring to FIG. 1, the exemplary gas spring 10 comprises a metal tube 22, with a base 24 and guide bush 26 welded thereto to define a container 12. A ram 28 extends through an aperture in the guide bush 26. A stainless steel bellows 30 is 15 welded at one end to bush 26 and at the other end to ram 28, thereby to define a closed or sealed space 14 together with the ram 28, tube 22, base 24 and bush 26, i.e. outside the bellows 30 and inside the container 12.

The base 24 is provided with a filling aperture 32 and valve 34 whereby the closed space may be filled with an inert gas 33 under pressure, such as nitrogen. The gas is indicated by dots in the Figure.

In use, the pressure of the gas acts upwardly as shown in the Figure on the ram 28.

The ram 28 has a circumferential stop 36 for limiting the maximum extension of the ram, upwardly in the orientation shown in FIG. 1.

The base 24 is provided with a threaded bore 38 which receives a reduced threaded end 40 of a guide retainer 42. The retainer has means for driving it into the thread 38, such as a slot 44.

The retainer 42 guides and retains a mechanical compression spring 46 in the form of a stack of Belleville washers 48 made of a heat-resistant metal. As is known, Belleville washers are domed washers which can be stacked with the individual domes either upward or downward. By selecting the number of washers and their orientations it is possible to control the initial length and spring constant of the spring formed by the stack of washers.

As can be seen in FIG. 1, the ram 28 has a blind internal bore 49, and the spring 46 is disposed partially within the blind bore 49 so as to be interposed between the ram 28 and the container 12. The spring 46 engages a step 50 on the underside of the ram 28, in the interior of the bore 49, to urge it in the same direction as the force of the gas pressure, i.e. upwardly in the Figure.

Figure 2:
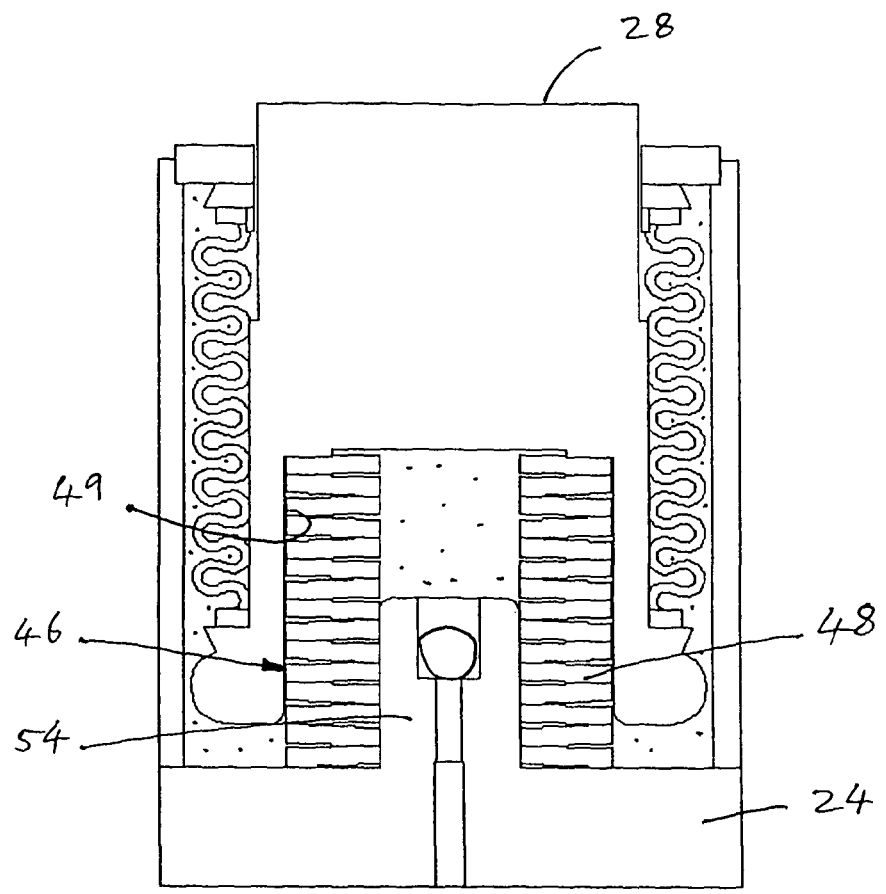
FIG. 2 is a schematic section of another embodiment of a gas spring in accordance with the invention.

FIG. 2 shows an alternative design in which the retainer 42 is eliminated. A spigot 54 is formed on the base 24 and serves to guide and locate some of the Belleville washers 48. Others are located by the internal bore 49 and others are indeed located by both the spigot 54 and the bore 49.

Figure 3:
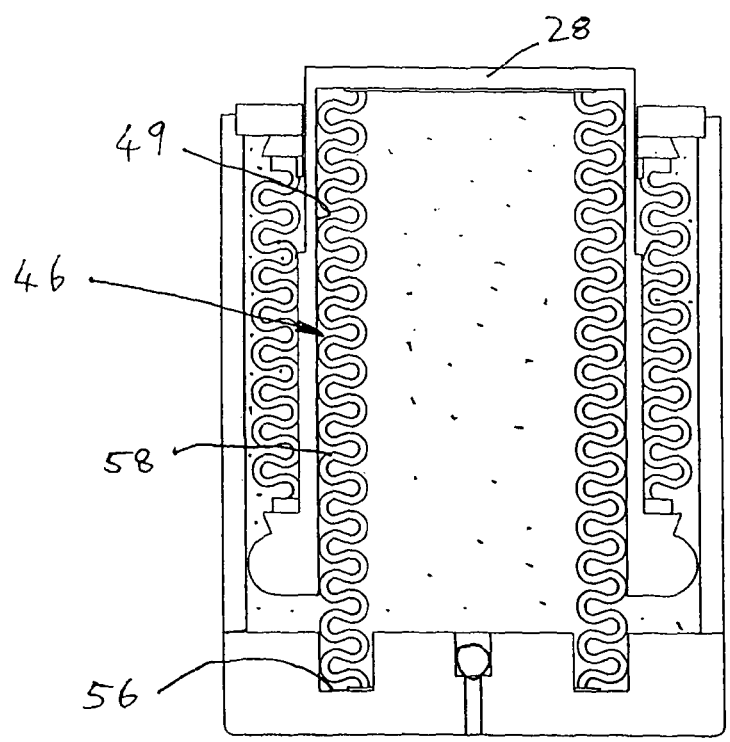
FIG. 3 is a schematic section of another embodiment of a gas spring in accordance with the invention.

FIG. 3 shows another design in accordance with the invention in which the retainer 42 or spigot 54 and washers 48 are replaced by a compression spring 46 seated in a circular groove 56 and engaging the underside of the ram 28, i.e. the blind end of the bore 49. In this example the spring is fabricated in the form of a bellows 58, but alternatively a coil spring could be used. In this case also, the mechanical compression spring 46 urges the ram 28 in the same direction as does the gas pressure. The other parts are similar to, or perform similar functions to, the equivalent parts in the FIG. 2 embodiment.

It is to be noted that in each of the above embodiments the mechanical compression spring 46 is disposed in a sealed space within the container, this being the same sealed space as contains the gas. We have found that metal springs in such a configuration can continue to operate reliably without suffering any adverse effects due to the environment.

Figure 4:
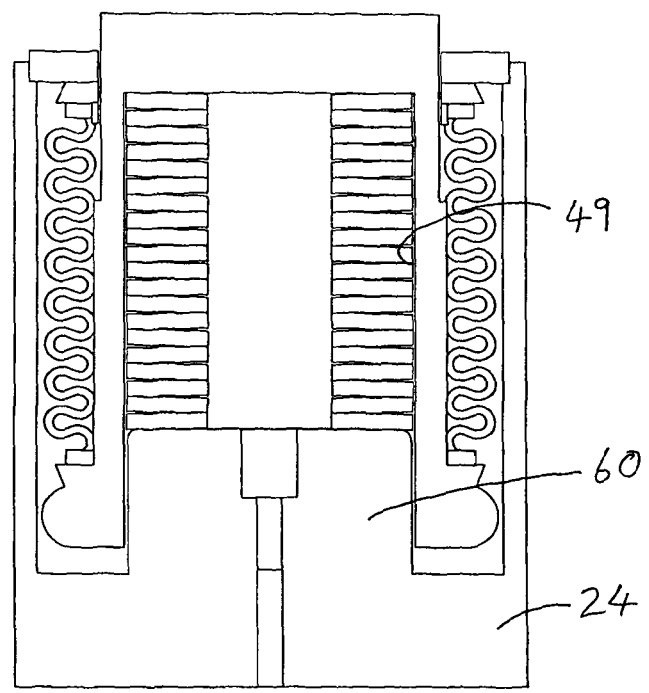
FIG. 4 is a schematic section of another embodiment of a gas spring in accordance with the invention.

FIG. 4 shows another design in accordance with the invention in which the base 24 has a raised nose 60 extending partially into the blind bore 49 and the mechanical compression spring 46 is seated on the nose 60 and thereby is disposed wholly inside the blind bore. This arrangement provides for the use of a shorter spring, which may be useful to give the required performance in certain applications, whilst also providing a very stable configuration against relative lateral movement of the various components.

Figure 5:
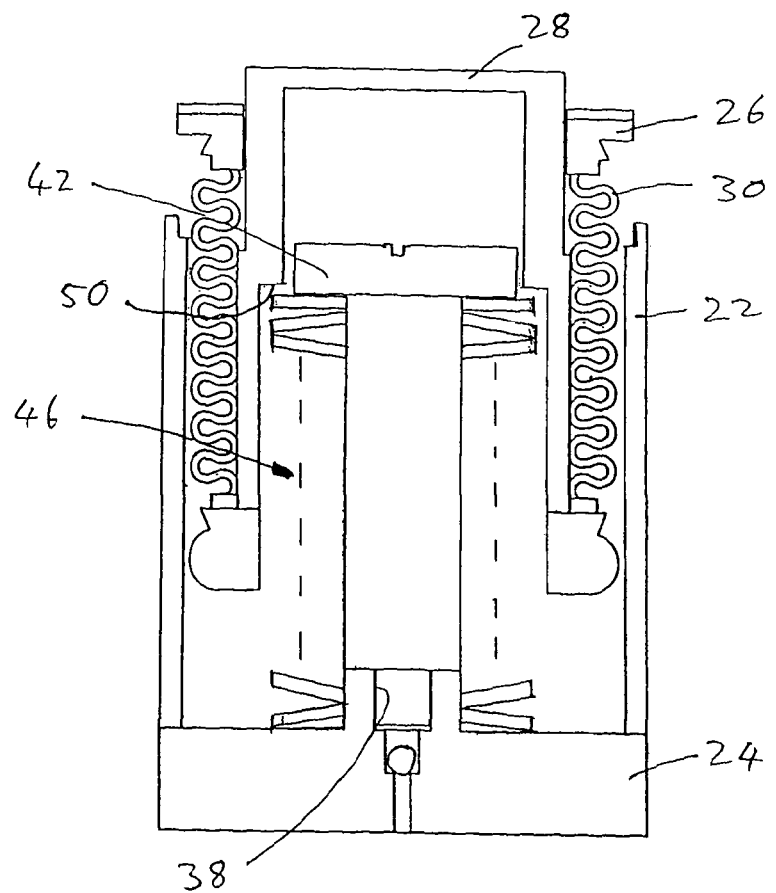
FIG. 5 is a schematic section of the gas spring of FIG. 1 showing a stage of the assembly.

FIG. 5 shows a stage in the assembly of the gas spring of FIG. 1. The guide bush 26, ram 28 and bellows 30 form a separate part from the rest of the device and are prefabricated. The spring 46 is assembled on the retainer 42 which is driven into the thread 38. In this embodiment the spring 46 is a stack of Belleville washers only indicated schematically and they are in their relaxed condition.

A clamp is used to press the guide bush 26 towards the base 24 and during this process the step 50 comes into engagement with the spring 46 and compresses it. This applies a preload on the spring 46, resulting in the condition shown in FIG. 1. The bush 26 is then welded to the tube 22 and the sealed container can then be charged with gas.

It will be appreciated that the force extending the ram results from both the gas pressure and the force of the mechanical compression spring. By providing a blind bore in the ram and locating the mechanical spring in the bore, a mechanical spring of appropriate length can be employed whilst still providing a compact overall design. By selecting the properties of the mechanical compression spring and by selecting the initial gas pressure, it is possible to tailor the initial force at room temperature, the force at higher temperatures, and the slope of the force/temperature curve. By using a lower initial gas pressure, the increased gas pressure inside the new gas spring as the temperature increases is less than in a gas spring where the total force is made up of gas alone. Depending on the ratio between gas force and spring force the force/temperature curve can be manipulated to provide the desired shape.

Having a secondary spring inside the unit also addresses the problem of immediate and complete failure. Once the gas has been expelled, the force from the spring remains, providing a limited amount of load to the plates.

In an example of the kind shown in FIG. 1, the force at ambient temperature on the new gas spring was split with 275 kgf provided by the mechanical spring (an alloy designed to withstand temperatures up to 700° C.) and the remaining 225 kgf provided by the gas. The forces of the new gas spring were compared against a known gas spring without a mechanical spring. Both springs were taken up to temperature and compressed to their working length. The results in the table below compare the new gas spring with the known gas spring.

| Temperature (° C.) | Known Gas Spring (kgf) | New Gas Spring (kgf) |
| --- | --- | --- |
| 20 | 500 | 501 |
| 100 | 580 | 531 |
| 200 | 715 | 561 |
| 300 | 966 | 634 |
| 400 | 1276 | 767 |
| 500 | 1380 | 851 |

Figure 6:
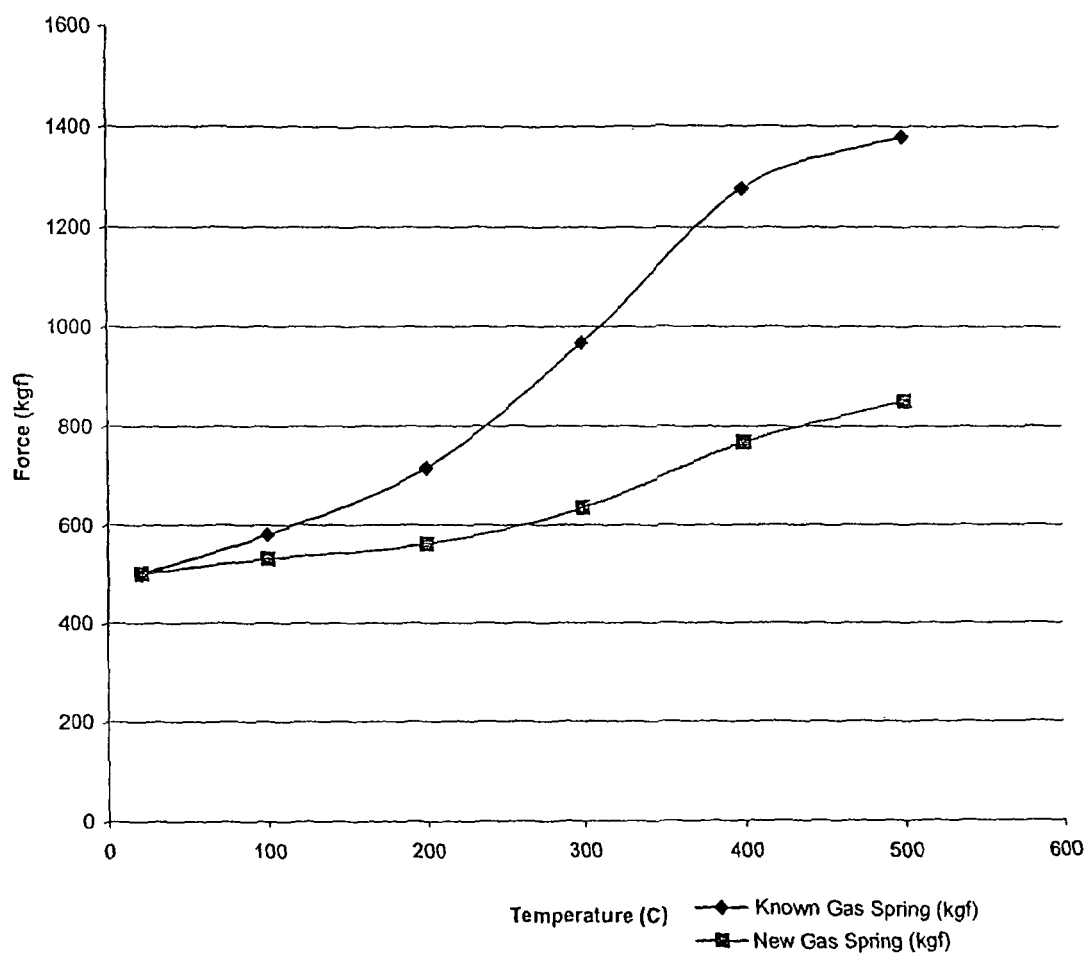
FIG. 6 is a graph showing the variation of force with temperature of a gas spring 10 according to the invention in comparison to a prior design.

The results are plotted in FIG. 6, and show that the gradient of the new spring is more gradual. In use in one example mechanism there are eight springs and the operating temperature is around 400° C. At this temperature one new gas spring will apply a force which is 509 kgf less than the known spring, reducing the total force by 4072 kgf. The performance and life of the gas spring are greatly improved as the external pressure exerted on the outer bellows is reduced.

The invention claimed is:

1. A gas spring for a sliding refractory gate valve, comprising a container, a ram which is extendable relative to the container, a bellows connected at one end to the ram and at the other end to a part of the container, a gas within the container outside the bellows and acting to compress the bellows and extend the ram, wherein the ram has a blind internal bore and a mechanical compression spring is at least partially disposed in the bore so as to be interposed between the ram and the container and also acting to extend the ram.

2. A gas spring as claimed in claim 1, wherein the mechanical compression spring is provided with a preload force.

3. A gas spring as claimed in claim 1, wherein the mechanical compression spring is disposed in a sealed space within the container.

4. A gas spring as claimed in claim 1, wherein the mechanical compression spring acts on the blind end of the bore.

5. A gas spring as claimed in claim 1, wherein the mechanical compression spring acts on a circular stop formed in the interior of the bore.

6. A gas spring as claimed in claim 1, wherein the mechanical compression spring is a coil spring.

7. A gas spring as claimed in claim 6, wherein the container has a base and the mechanical compression spring is interposed between the base and the ram.

8. A gas spring as claimed in claim 7, wherein the mechanical compression spring comprises a stack of Belleville washers, and further comprising a guide retainer connected to the base and guiding and retaining the stack of Belleville washers.

9. A gas spring as claimed in claim 7, wherein the mechanical compression spring comprises a stack of Belleville washers, and further comprising a spigot connected to the base and guiding and retaining at least some of the stack of Belleville washers.

10. A gas spring as claimed in claim 1, wherein the mechanical compression spring is a metal bellows.

11. A gas spring as claimed in claim 1, wherein the mechanical compression spring comprises a stack of Belleville washers.

12. A gas spring as claimed in claim 1 wherein the container has a base comprising a raised nose extending partially into the blind bore and the mechanical compression spring is seated on the nose and thereby is disposed wholly inside the blind bore.

* * * * *